(12) United States Patent
Shin et al.

(10) Patent No.: US 11,770,622 B2
(45) Date of Patent: Sep. 26, 2023

(54) PROCESSOR, IMAGE PROCESSING DEVICE INCLUDING THE SAME, AND CONTROL METHOD OF IMAGE PROCESSING DEVICE

(71) Applicant: Samsung Electronics Co., Ltd., Suwon-si (KR)

(72) Inventors: Deokha Shin, Seoul (KR); Youngjun Choi, Anyang-si (KR); Eunji Jeong, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 120 days.

(21) Appl. No.: 17/319,528

(22) Filed: May 13, 2021

(65) Prior Publication Data
US 2022/0116534 A1  Apr. 14, 2022

(30) Foreign Application Priority Data
Oct. 12, 2020  (KR) .................. 10-2020-0130885

(51) Int. Cl.
*H04N 23/80* (2023.01)
*G06T 5/00* (2006.01)
*G06T 1/60* (2006.01)
*G06V 10/40* (2022.01)

(52) U.S. Cl.
CPC .............. *H04N 23/80* (2023.01); *G06T 1/60* (2013.01); *G06T 5/005* (2013.01); *G06V 10/40* (2022.01)

(58) Field of Classification Search
CPC .. H04N 5/23229; H04N 5/367; H04N 17/002; H04N 9/04557; G06T 1/60; G06T 5/005; G06V 10/40; G09G 2330/08; G09G 3/006; G09G 2330/10; G09G 2330/12
See application file for complete search history.

(56) References Cited

U.S. PATENT DOCUMENTS

| | | | |
|---|---|---|---|
| 6,618,084 B1 * | 9/2003 | Rambaldi | H04N 5/367 |
| | | | 348/E5.081 |
| 6,737,625 B2 | 5/2004 | Baharav et al. | |
| 7,015,961 B2 | 3/2006 | Kakarala | |
| 7,034,873 B2 | 4/2006 | Mendis et al. | |
| 7,522,200 B2 | 4/2009 | Dong | |
| 8,971,659 B2 | 3/2015 | Forutanpour | |
| 9,124,829 B2 | 9/2015 | Patel | |

\* cited by examiner

*Primary Examiner* — Yogesh K Aggarwal
(74) *Attorney, Agent, or Firm* — Harness, Dickey & Pierce, P.L.C.

(57) ABSTRACT

An image processing device, which includes processing circuitry configured to cause the image processing device to first detect a first bad pixel based on first image data, correct the first bad pixel based on first values of first peripheral pixels in response to the first detection to obtain a first correction result, the first peripheral pixels being peripheral to the first bad pixel, second detect the first bad pixel and a second bad pixel based on the first image data, the second bad pixel being adjacent to the first bad pixel, correct the second bad pixel based on second values of second peripheral pixels to obtain a second correction result, the second peripheral pixels being peripheral to the second bad pixel, and correct the first bad pixel by using the first correction result stored in a buffer in response to the second detection.

20 Claims, 10 Drawing Sheets

PROCESSOR, IMAGE PROCESSING DEVICE INCLUDING THE SAME, AND CONTROL METHOD OF IMAGE PROCESSING DEVICE

CROSS-REFERENCE TO RELATED APPLICATIONS

This application claims priority under 35 U.S.C. § 119 to Korean Patent Application No. 10-2020-0130885 filed on Oct. 12, 2020, in the Korean Intellectual Property Office, the disclosures of which are incorporated by reference herein in their entireties.

BACKGROUND

Embodiments of the present disclosure described herein relate to an image processor, an image processing device including the same, and a control method of the image processing device, and more particularly, relate to a method of detecting and correcting a bad pixel of an image.

A manner in which an array of pixels is formed such that a plurality of pixels share a floating node has been utilized to detect a bad pixel of an image sensed by a conventional image sensor.

However, the above manner has great influence of a noise in detecting a bad pixel of an image, thereby causing the decrease of yield of an image sensor.

SUMMARY

Embodiments of the present disclosure provide an image processing device capable of storing, in the buffer, information about a bad pixel and information of an image in which a bad pixel is corrected, and utilizing the information stored in the buffer when an image is corrected.

According to embodiments, an image processing device includes processing circuitry configured to cause the image processing device to first detect a first bad pixel based on first image data, correct the first bad pixel based on a plurality of first values of a plurality of first peripheral pixels in response to the first detection to obtain a first correction result, the plurality of first peripheral pixels being peripheral to the first bad pixel, second detect the first bad pixel and a second bad pixel based on the first image data, the second bad pixel being adjacent to the first bad pixel, correct the second bad pixel based on a plurality of second values of a plurality of second peripheral pixels to obtain a second correction result, the plurality of second peripheral pixels being peripheral to the second bad pixel, and correct the first bad pixel by using the first correction result stored in a buffer in response to the second detection.

Also, the processing circuitry is configured to cause the image processing device to receive second image data after receiving the first image data, and determine whether bad pixels of the first image data are the same as bad pixels of the second image data, the bad pixels of the first image data comprising the first bad pixel and the second bad pixel.

In addition, the second image data is different from the first image data, and the processing circuitry is configured to cause the image processing device to correct the second image data based on first correction image data in response to determining the bad pixels of the first image data are the same as the bad pixels of the second image data, the first correction image data being stored in the buffer, and the first correction image data including the first correction result and the second correction result.

Also, the second image data is different from the first image data, and the processing circuitry is configured to cause the image processing device to correct the bad pixels of the second image data to obtain second correction image data in response to determining the bad pixels of the first image data are not the same as the bad pixels of the second image data.

In addition, the processing circuitry is configured to cause the image processing device to generate first correction image data associated with a pattern, the pattern comprising the first bad pixel and the second bad pixel, the first bad pixel and the second bad pixel being associated with a vertical pattern, and store the first correction image data in the buffer.

Also, the processing circuitry is configured to cause the image processing device to extract a portion of the first image data, the portion including the first bad pixel and the second bad pixel, and generates first correction image data associated with the portion.

In addition, the processing circuitry is configured to cause the image processing device to extract a portion of the first image data based on location data of a plurality of pixels, the portion including the first bad pixel and the second bad pixel, and the plurality of pixels including the first bad pixel and the second bad pixel.

According to embodiments, a control method of an image processing device includes first detecting, by processing circuitry, a first bad pixel based on first image data, correcting, by the processing circuitry, the first bad pixel based on a plurality of first values of a plurality of first peripheral pixels in response to the first detecting to obtain a first correction result, the plurality of first peripheral pixels being peripheral to the first bad pixel, second detecting, by the processing circuitry, the first bad pixel and a second bad pixel based on the first image data, the second bad pixel being adjacent to the first bad pixel, correcting, by the processing circuitry, the second bad pixel based on a plurality of second values of a plurality of second peripheral pixels to obtain a second correction result, the plurality of second peripheral pixels being peripheral to the second bad pixel, and correcting, by the processing circuitry, the first bad pixel by using the first correction result stored in a buffer in response to the second detecting.

Also, the method further comprises receiving second image data after receiving the first image data, and determining whether bad pixels of the first image data are the same as bad pixels of the second image data, the bad pixels of the first image comprising the first bad pixel and the second bad pixel.

In addition, the second image data is different from the first image data, and the method further comprises correcting the second image data based on first correction image data in response to determining the bad pixels of the first image data are the same as the bad pixels of the second image data, the first correction image data being stored in the buffer, and the first correction image data comprising the first correction result and the second correction result.

Also, the second image data is different from the first image data, and the method further comprises correcting the bad pixels of the second image data to obtain second correction image data in response to determining the bad pixels of the first image data are not the same as the bad pixels of the second image data.

In addition, the method further comprises generating first correction image data associated with a pattern, the pattern comprising the first bad pixel and the second bad pixel, the first bad pixel and the second bad pixel being associated with a vertical pattern, and storing the first correction image data in the buffer.

Also, the method further comprises extracting a portion of the first image data, the portion including the first bad pixel and the second bad pixel, and generating first correction image data associated with the portion.

In addition, the method further comprises extracting a portion of the first image data based on location data of a plurality of pixels, the portion including the first bad pixel and the second bad pixel, and the plurality of pixels including the first bad pixel and the second bad pixel.

According to embodiments, a processor for an image processing device includes an image determining device configured to first detect a first bad pixel based on first image data, and second detect the first bad pixel and a second bad pixel based on the first image data, the second bad pixel being adjacent to the first bad pixel, and an image correcting device configured to correct the first bad pixel based on a plurality of first values of a plurality of first peripheral pixels in response to the first detection to obtain a first correction result, the plurality of first peripheral pixels being peripheral to the first bad pixel, correct the second bad pixel based on a plurality of second values of a plurality of second peripheral pixels to obtain a second correction result, the plurality of second peripheral pixels being peripheral to the second bad pixel, and correct the first bad pixel by using the first correction result stored in an external buffer in response to the second detection.

Also, the image determining device is configured to receive second image data after receiving the first image data, and determine whether bad pixels of the first image data are the same as bad pixels of the second image data, the bad pixels of the first image data comprising the first bad pixel and the second bad pixel.

In addition, the second image data is different from the first image data, and the image correcting device is configured to correct the second image data based on first correction image data in response to determining the bad pixels of the first image data are the same as the bad pixels of the second image data, the first correction image data being stored in the external buffer, and the first correction image data including the first correction result and the second correction result.

Also, the second image data is different from the first image data, and the image correcting device is configured to correct the bad pixels of the second image data to obtain second correction image data in response to determining the bad pixels of the first image data are not the same as the bad pixels of the second image data.

In addition, the image correcting device is configured to generate first correction image data associated with a pattern, the pattern comprising the first bad pixel and the second bad pixel, the first bad pixel and the second bad pixel being associated with a vertical pattern, and store the first correction image data in the external buffer.

Also, the image correcting device is configured to extract a portion of the first image data, the portion including the first bad pixel and the second bad pixel, and generate first correction image data associated with the portion.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
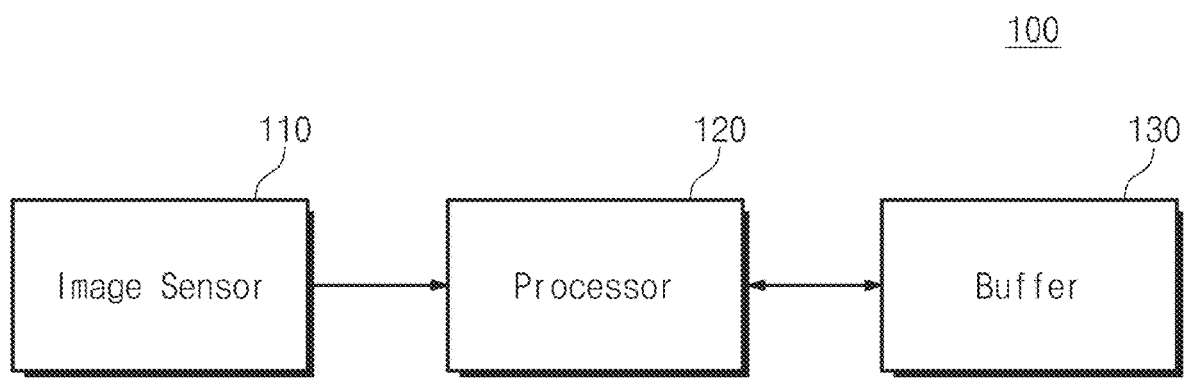
FIG. 1 is a block diagram of an image processing device according to embodiments.

The same reference numerals denote the same elements throughout the specification. In the specification, all elements of embodiments are not described, and general contents in the art, or repeated contents between embodiments, may not be described. In the specification, terms such as "parts", "modules", "members", and "blocks" may be implemented by using a combination of hardware and software, or hardware. In embodiments, a plurality of parts, modules, members, or blocks may be implemented with a single element, or one part, module, member, or block may include a plurality of elements.

Throughout the specification, when a part is referred to as being "connected" to another part, it includes "directly connected" and "indirectly connected," and the "indirectly connected" includes "connected through a wireless communication network."

In addition, when a part "includes" an element, another element may be further included, rather than excluding the existence of another element, unless otherwise described.

Terms "first", "second", and the like are used herein to distinguish one element from another element, and the elements are not limited to the terms described above.

As used herein, singular forms "a" and "an" are intended to include plural forms as well, unless the context clearly indicates otherwise.

Reference numerals in operations are used for the sake of convenience of description and do not describe an order of the operations, and the operations may be performed through an order different from the described order unless the context clearly indicates a specific order.

Hereinafter, a principle of action and embodiments of the present disclosure will be described with reference to the accompanying drawings.

FIG. 1 is a block diagram of an image processing device 100 according to embodiments.

Referring to FIG. 1, the image processing device 100 may include an image sensor 110, a processor 120, and/or a buffer 130.

The image sensor 110 may sense an external environment and output image data. In detail, the image sensor 110 may sense the external environment through (e.g., to generate) an image and transfer the image data to the processor 120.

The processor 120 may determine whether a bad (or defective) pixel is present at (e.g., based on and/or corresponding to) the input image data, and when it is determined that a bad pixel is present at the input image data, the processor 120 may generate a correction image.

The processor 120 may be provided with image data from the image sensor 110, determine whether a bad pixel pattern corresponding to a target pattern is present at the image data, based on a given reference, and generate first correction image data, in which the bad pixel is corrected, based on a determination result. The first correction image data may include a correction result of the bad pixel (or the bad pixel pattern). The bad pixel pattern may comprise one or more bad pixels. Also, the processor 120 may classify image data received from the image sensor 110 as first image data or second image data. The second image data may be image data that are input with a time difference from the first image data and may be the same as or different from the first image data. Also, in the case of performing a correction on the input image data, the processor 120 may utilize information stored in the buffer 130. An operation of the processor 120 will be more fully described with reference to FIG. 4.

The buffer 130 may store correction image data. In detail, in the case where the processor 120 determines that data corresponding to a bad pixel are present at the input image data and generates a correction image, the buffer 130 may store data corresponding to the bad pixel corrected by the processor 120 and (e.g., in association with) data of an image in which the bad pixel is corrected (e.g., correction image data), and may provide correction image data to the processor 120 when new image data are input to the processor 120. Also, when it is determined that a new bad pixel is present at the input image data, the buffer 130 may store data corresponding to the new bad pixel; but, when it is determined that a new bad pixel is absent from the input image data, the buffer 130 may not store any data (e.g., may not store any data corresponding to the new bad pixel).

Figure 2:
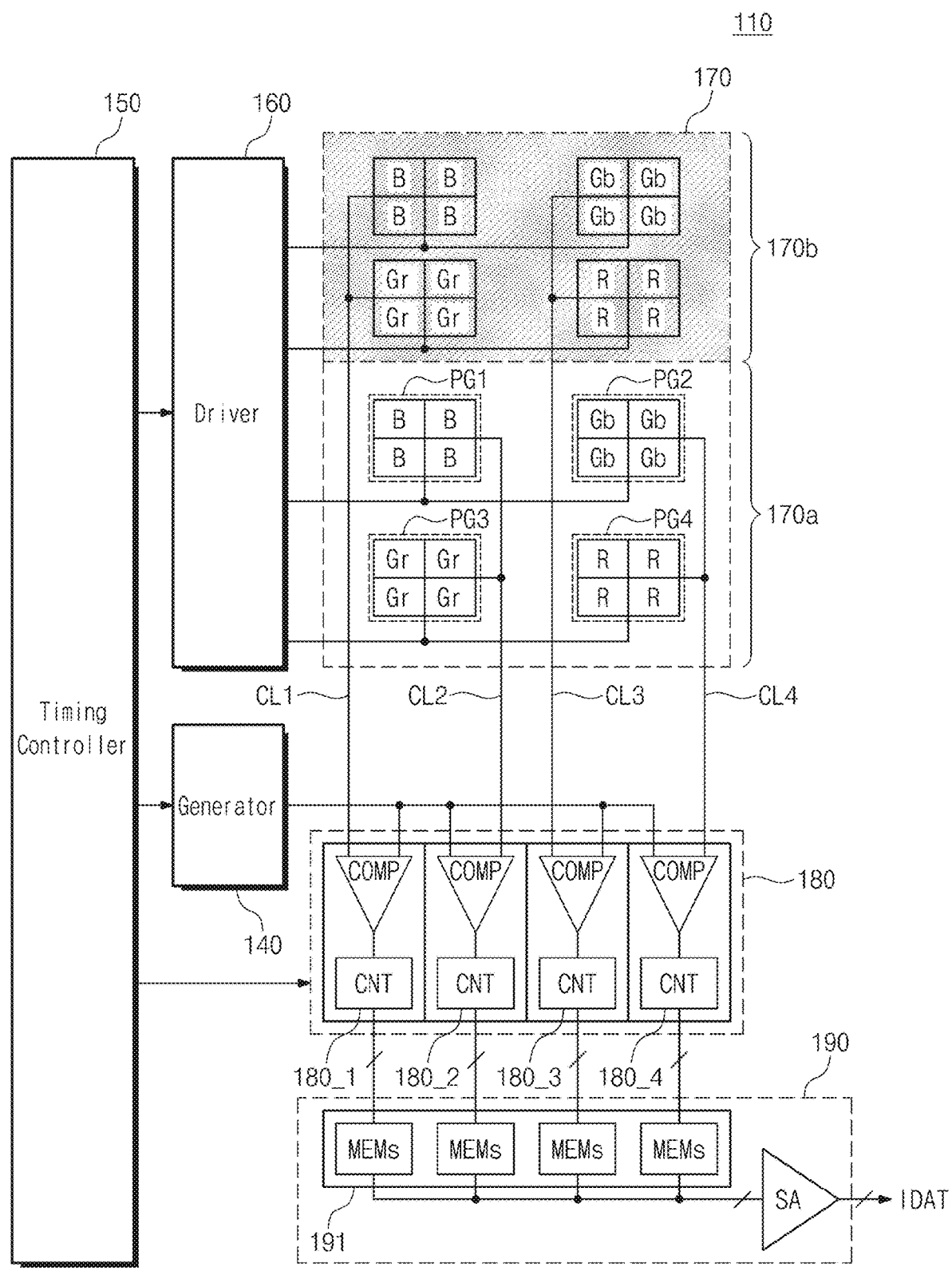
FIG. 2 is an example of an image processing device according to embodiments.
Figure 3:
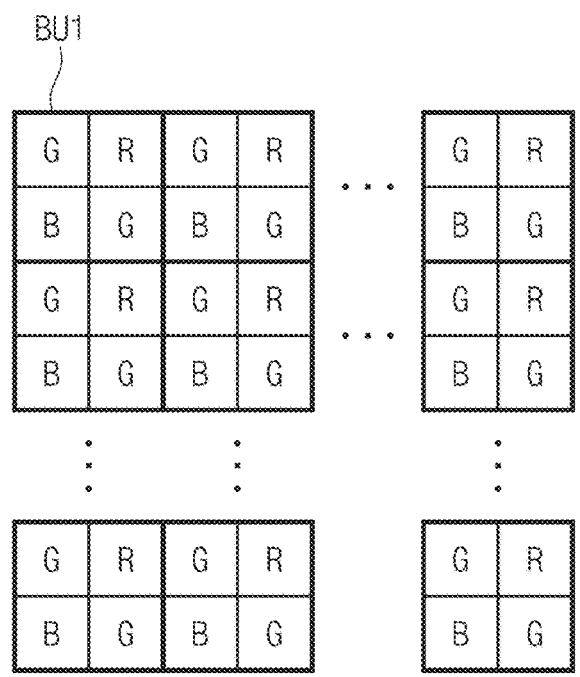
FIG. 3 illustrates an example of processing image data output from an image sensor according to embodiments.

FIG. 2 is an example of the image sensor 110 of FIG. 1, and FIG. 3 illustrates an example of processing image data output from the image sensor 110.

The image sensor 110 may include a generator 140 for generating a ramp signal, a timing controller 150, a driver 160, a pixel array 170, an analog-to-digital converting block (hereinafter referred to as an "ADC block") 180, and/or a data output unit 190.

The generator 140 may generate the ramp signal. The generator 140 may operate under control of the timing controller 150. For example, the generator 140 may operate in response to control signals such as a ramp enable signal and a mode signal. When the ramp enable signal is activated, the generator 140 may generate the ramp signal having a slope that is determined based on the mode signal.

The timing controller 150 may generate a control signal and/or a clock for controlling an operation and/or a timing of each of the generator 140, the driver 160, and the ADC block 180.

The driver 160 may select and drive a row of the pixel array 170. The driver 160 may decode an address and/or a control signal generated by the timing controller 150, and may generate control signals for selecting and driving a row of the pixel array 170. For example, the control signals may include a signal for selecting a pixel, a signal for resetting a floating diffusion node, a signal for selecting a column line, etc.

The pixel array 170 may include a plurality of pixels arranged in a matrix form along rows and columns, and may be divided into an active pixel region 170a and an optical black region 170b. Each of the plurality of pixels may include a photoelectric conversion element. Each pixel of the active pixel region 170a may sense a light by using the photoelectric conversion element and may convert the sensed light to an electrical signal (hereinafter referred to as a "pixel signal"). For example, the photoelectric conversion element may include a photo diode, a photo transistor, a photo gate, a pinned photo diode, etc. In an example is illustrated in FIG. 2, the optical black region 170b is disposed at a top row of the pixel array 170, but embodiments are not limited thereto.

The pixel array 170 may include a plurality of pixel groups PG (e.g., PG1, PG2, PG3 and PG4). Each pixel group PG may include at least two or more pixels. In an example illustrated in FIG. 2, the pixel group PG includes pixels arranged in two rows and two columns. Pixels constituting one pixel group PG may share one floating diffusion node (or a floating diffusion region). However, embodiments are not limited thereto. For example, pixels constituting one pixel group PG may share a plurality of floating diffusion nodes. In addition, in an example illustrated in FIG. 2, the pixel array 170 includes pixel groups arranged in four rows and two columns (e.g., 4×2 pixel groups). However, embodiments are not limited thereto. According to embodiments, the term "pixel" as used herein may refer to each of the pixels in the pixel groups PG.

Each pixel group PG may include pixels of the same color or similar colors. For example, the pixel group PG may include red pixels "R" to convert a light of a red spectrum to an electrical signal, green pixels Gr/Gb to convert a light of a green spectrum to an electrical signal, or blue pixels "B" to convert a light of a blue spectrum to an electrical signal. For example, the pixels constituting the pixel array 170 may be arranged in the form of a tetra-Bayer pattern.

Meanwhile, a plurality of color filters may be formed on the pixel groups PG constituting the pixel array 170. For example, a multi-color filter array (multi-CFA) may be formed thereon. A height at which a color filter is formed may vary depending on a process order. For example, a height of a relatively early formed color filter from a substrate may be relatively low. In contrast, a height of a relatively late formed color filter from the substrate may be relatively high. A relatively low color filter may be influenced by a relatively high color filter, thereby causing crosstalk between pixels.

Pixel groups arranged along one column may be alternately connected to two column lines. For example, some of pixel groups disposed at a first column may be connected to a first column line CL1, and the others thereof may be connected to a second column line CL2. As in the above description, some of pixel groups disposed at a second column may be connected to a third column line CL3, and the others thereof may be connected to a fourth column line CL4.

The ADC block 180 may convert an analog signal (e.g., a pixel signal) output from the pixel array 170 to a digital signal.

In embodiments, the ADC block 180 may include four ADCs 180_1, 180_2, 180_3, and 180_4, each of which includes a comparator COMP and a counter CNT. The comparator COMP may compare a pixel signal output through a column line (e.g., one of CL1 to CL4) connected to the comparator COMP with a ramp signal and may output a comparison result. For example, the comparator COMP may operate based on a correlated double sampling (CDS) technique for obtaining a reset signal and an image signal with regard to a pixel signal, and extracting a difference between the reset signal and the image signal as an effective signal component.

The counter CNT may operate under control of the timing controller 150 and may count pulses of an output signal of the corresponding comparator COMP. For example, the counter CNT may operate in response to control signals such as a counter clock signal, a counter reset signal for controlling a reset of the counter CNT, and an inversion signal for inverting an internal bit of the counter CNT. The counter CNT may count a comparison result signal depending on the counter clock signal and may output a result of the counting as a digital signal.

The counter CNT may include an up/down counter, a bit-wise inversion counter, etc. An operation of the bit-wise counter may be similar to an operation of the up/down counter. For example, the bit-wise counter may perform the following functions: a function to perform only up-counting and a function to convert all internal bits of the counter CNT in response to an input of a specific signal such that the 1's complement is obtained. The bit-wise counter may perform a reset count and may invert a result of the reset count so as to be converted to the 1's complement, that is, a negative value.

The data output unit 190 may include a set 191 of memories MEMs and a sense amplifier SA. The memories MEMs may correspond to the ADCs 180_1, 180_2, 180_3, and 180_4, respectively. Each of the memories MEMs may store a digital signal output from the corresponding ADC. The sense amplifier SA may sense and amplify the digital signals stored in the memories MEMs. The sense amplifier SA may output the amplified digital signals as image data IDAT. For example, the image data IDAT may be formed of 11 bits.

Also, referring to FIG. 3, the processor 120 may perform a remosaic operation on image data. Here, the processor 120 may detect a bad pixel by using a given pixel unit BU1 as a frame. In detail, the processor 120 may use an RGB format for performing an image correction operation and may perform remosaic on image data (e.g., the image data IDAT) received from the image sensor 110 illustrated in FIG. 2. As the processor 120 performs remosaic on the image data received from the image sensor 110, the processor 120 may generate image data of a Bayer pattern as illustrated in FIG. 3.

Figure 4:
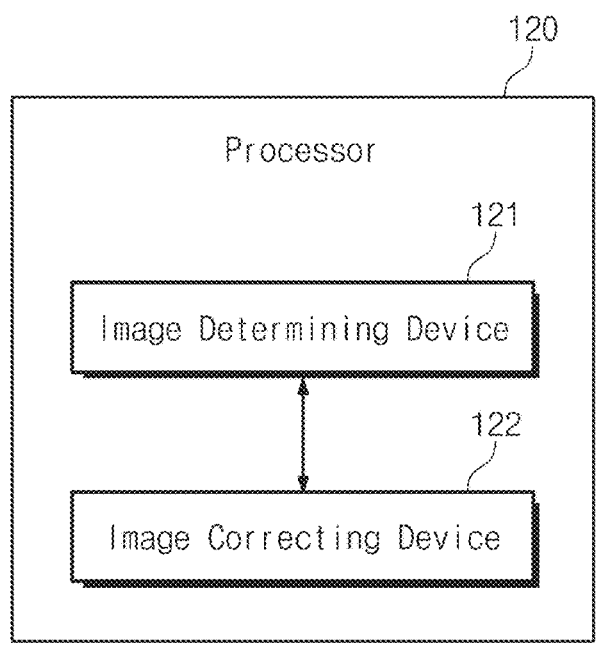
FIG. 4 is a block diagram of a processor of an image processing device according to embodiments.

FIG. 4 is a block diagram of the processor 120 of the image processing device 100 according to embodiments.

Referring to FIG. 4, the processor 120 may include an image determining device 121 and/or an image correcting device 122.

The image determining device 121 may determine whether a bad pixel is present at (e.g., based on and/or corresponding to) an input image and/or may determine a bad pixel pattern. In detail, the image determining device 121 may select a specific location of an image and may determine whether a bad pixel is present at pixels belonging to the specific location. Here, a bad pixel may include one pixel or a plurality of pixels. Also, the specific location may include a square or rectangle frame of a given pixel unit (e.g., given dimensions which may be expressed in one or more quantities of pixels representing the height and/or width of the frame), and the image determining device 121 may extract a portion of the frame, in which a bad pixel exists (e.g., a rectangle portion of the frame), based on location data of each pixel. A bad pixel may include a horizontal or vertical bad pixel string. Also, the image determining device 121 may determine whether a bad pixel pattern is an intermittent, horizontal, or vertical pattern. That is, the image determining device 121 may determine the existence of a horizontal string of bad pixels or a vertical string of bad pixels, and may determine the bad pixel pattern. According to embodiments, the image processing device 100 may store one or more target patterns (e.g., in the buffer 130). According to embodiments, each of the target patterns may represent a specific pattern (e.g., an intermittent, horizontal, or vertical pattern) corresponding to a pixel defect. According to embodiments, the pixel defect may be a defect occurring at one or more floating nodes shared by a plurality of pixels. According to embodiments, the image determining device 121 may determine a bad pixel is present according to whether a pixel matches or is similar to a corresponding pixel in one of the target patterns. According to embodiments, the image determining device 121 may determine a particular target pattern corresponding to the bad pixel. According to embodiments, the image determining device 121 may determine a vertical or horizontal bad pixel string is present according to whether one or more pixels in the string matches or is similar to one or more corresponding pixels in one of the target patterns.

Also, when other image data are received, the image determining device 121 may determine the sameness (e.g., similarity) of the input image data. For example, in the case where first image data are received and second image data are then received, the image determining device 121 may determine the sameness of first image data and second image data. Also, when it is determined that one or more bad pixels are present at the first image data, and one or more bad pixel are present at the second image data, the image determining device 121 may determine the sameness of the bad pixel(s) of the first image data and the bad pixel(s) of the second image data.

The image correcting device 122 may correct an image based on a determination result of the image determining device 121. In detail, the image correcting device 122 may determine whether to utilize information stored in the buffer 130, based on the determination result of the image determining device 121. When the image determining device 121 determines that the bad pixel of the first image data is the same as or similar to the bad pixel of the second image data, the image correcting device 122 may correct the second image data to be the same as or similar to the first correction image data. However, when it is determined that the bad pixel of the first image data is different from the bad pixel of the second image data, the image correcting device 122 may generate second correction image data where the bad pixel of the second image data is corrected and store the second correction image data in the buffer 130. Here, the terms "first" and "second" may be used to classify image data.

Also, the image correcting device 122 may correct a bad pixel based on a bad pixel pattern. For example, in the case where a bad pixel is associated with a vertical pattern, the image correcting device 122 may generate correction image data associated with the bad pixel and may store the generated correction image data in the buffer 130. According to embodiments, the correction image data may be associated with a pattern (e.g., a target pattern) including the bad pixel(s). Operations of the image correcting device 122 when a bad pixel is associated with a horizontal pattern, or an intermittent pattern, are performed to be the same as or similar to the operations of the image correcting device 122 when a bad pixel is associated with the vertical pattern.

That is, when the image determining device 121 determines that the first image data and the second image data are the same or similar, or that bad pixels of input images are associated with the same pattern or similar patterns, the image correcting device 122 may correct an input image data by utilizing information stored in the buffer 130. However, when the image determining device 121 determines that the first image data is different from the second image data, or that bad pixels of input image data are different in pattern, the image correcting device 122 may generate new correction image data and may store the new correction image data in the buffer 130.

Figure 5:
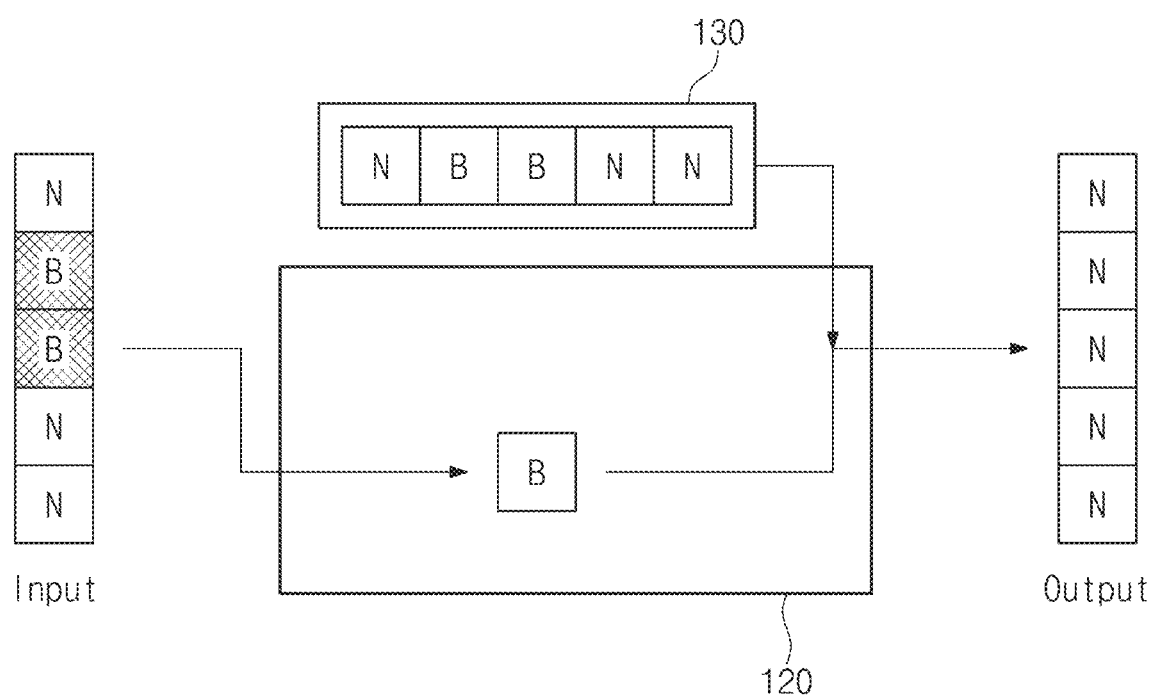
FIG. 5 is a flowchart illustrating a process in which an image processing device corrects image data according to embodiments.
Figure 6:
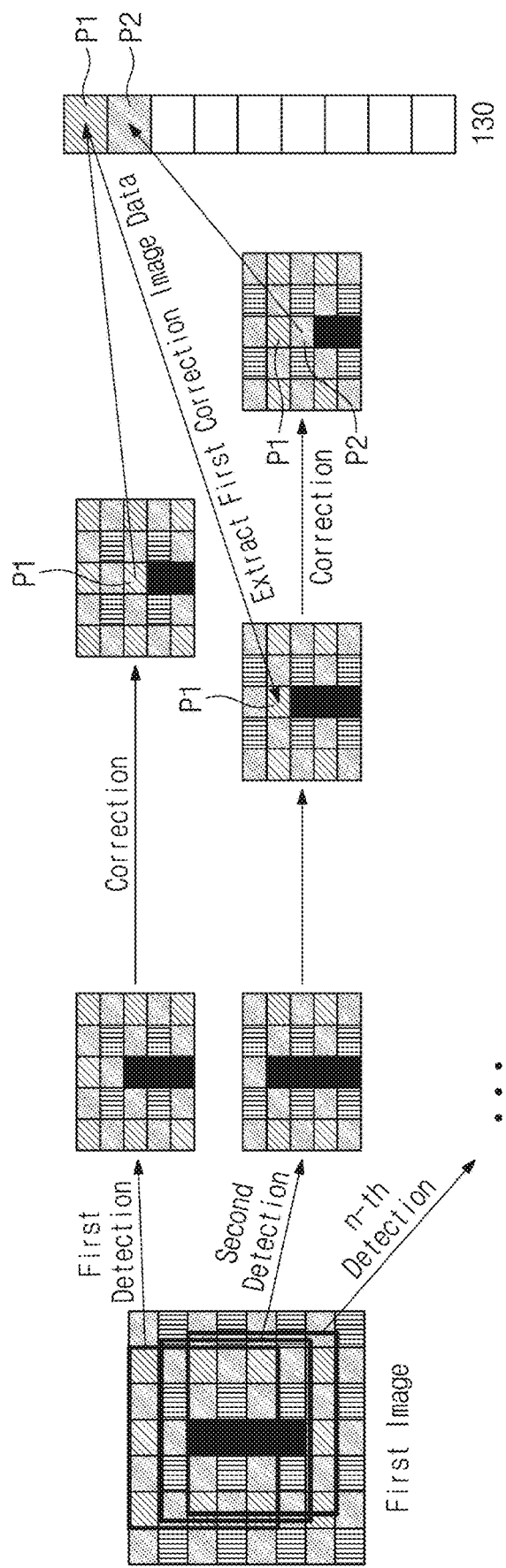
FIG. 6 illustrates a process in which an image processing device generates a correction image according to embodiments.

FIG. 5 illustrates a process in which the processor 120 corrects a bad pixel according to embodiments, and FIG. 6 illustrates a process in which the image processing device 100 generates a correction image. In FIG. 5, a shaded box indicates a bad pixel "B". The processor 120 may correct the bad pixel "B" by utilizing information stored in the buffer 130 and may generate a correction pixel "N".

Referring to FIGS. 5 and 6, the processor 120 of the image processing device 100 according to embodiments may receive a vertical string of pixels and may determine whether a bad pixel is present at (e.g., among) the received pixels. As described above, when it is determined that a bad pixel is present at the received pixels, and it is determined that data of the bad pixel is stored in the buffer 130, the processor 120 may generate a correction image by utilizing data stored in the buffer 130. However, when it is determined that information of the bad pixel present at the received pixels is not stored in the buffer 130, the processor 120 may generate a new correction image, and may store the generated correction image and the information of the bad pixel in the buffer 130.

Referring to FIG. 6, the processor 120 may determine whether a bad pixel is present at (e.g., based on and/or corresponding to) an image input in units of specific frame. Here, the specific frame may be expressed as, but is not limited to, a square frame. The image input may be an image of the bayer pattern. The processor 120 may perform first to n-th detection operations on data of the input image. Based on results of the detection operations, the processor 120 may determine whether a bad pixel exists and may determine a bad pixel pattern. For example, the first to n-th detection operations may be associated with detecting bad pixels in a row direction, a column direction, or a combination thereof. According to embodiments, the processor 120 may perform the first to n-th detection operations by determining whether one or more bad pixels exists based on a first frame (e.g., a specific number of pixels in a row and/or column direction) of the image input before moving the frame in a direction (e.g., the row direction, the column direction, or the combination thereof) and repeating the determination. In this way, all of the pixels corresponding to the image input may be considered.

When it is determined by the processor 120 that a bad pixel is present at image data input for the first detection operation, the processor 120 may correct the bad pixel with reference to peripheral pixels and may store a correction result in the buffer 130. For example, the processor 120 may calculate a value of a first pixel P1 with reference to values of peripheral pixels of the first pixel P1. In embodiments, the processor 120 may refer to values of peripheral pixels of the first pixel P1, the peripheral pixels associated with a color (e.g., red) corresponding to the first pixel P1 (in the illustrated example, the peripheral pixels shaded with diagonal lines). The processor 120 may store the calculated value (or a correction result) of the first pixel P1 in the buffer 130. The calculated value (or the correction result) of the first pixel P1 may be included to (e.g., in) the first correction image data. According to embodiments, the peripheral pixels may be a specific number of pixels of the same color as or a similar color to the first pixel that are in the closest proximity to the first pixel P1. The specific number of pixels may be a design parameter determined through empirical study.

When it is determined by the processor 120 that a bad pixel present at (e.g., based on and/or corresponding to) an image input for the second detection operation is the same as or similar to the bad pixel detected in the first detection operation, the processor 120 may correct the input image based on the information stored in the buffer 130. For example, in processing associated with a second defect of FIG. 6, the processor 120 may use the value of the first pixel P1 stored in the buffer 130 for processing the defect of the first pixel P1. For example, the processor 120 may extract the value (or the correction result) of the first pixel P1 from the first correction image data. In addition, the processor 120 may calculate a value of a second pixel P2 with reference to values of peripheral pixels for processing a defect of the second pixel P2. In embodiments, the processor 120 may refer to values of peripheral pixels of the second pixel P2, the peripheral pixels associated with a color (e.g., green) corresponding to the second pixel P2 (in the illustrated example, the peripheral pixels shade with dots). According to the above description, the processor 120 may correct bad pixels (e.g., a red pixel and a green pixel) detected in the second detection operation by making reference to the value of the first pixel P1 stored in the buffer 130 and/or calculating the value of the second pixel P2. The processor may store the calculated value of the second pixel P2 in the buffer 130. The calculated value of the second pixel P2 may be also included to (e.g., in) the first correction image data.

The above correction operation may be equally or similarly applied to the remaining detection operation (e.g., the n-th detection operation). According to embodiments, the image input for the second detection operation may be a different image from that used for the first detection operation, or may be the same image as or a similar image to that used for the first detection operation and corresponding to a subsequent iteration of the first through n-th detection operations.

Figure 7:
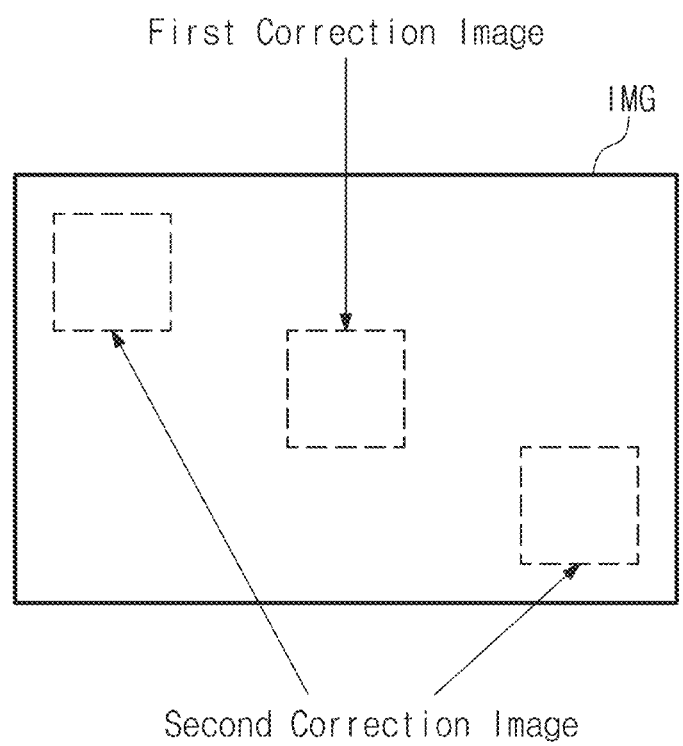
FIG. 7 illustrates an example of an image sensor correction operation performed by an image processing device using a portion of image data according to embodiments.

FIG. 7 conceptually illustrates an example of an image sensor correction operation performed by the image processing device 100 using a portion of image data according to embodiments.

The image processing device 100 according to embodiments may detect a bad pixel by utilizing only one frame, or may determine the following by simultaneously or contemporaneously utilizing a plurality of frames: whether a bad pixel is present at an input image and a bad pixel pattern.

Here, image data may correspond to a result of performing remosaic on an output of the image sensor 110 (e.g., may correspond to a pixel map of FIG. 3). In embodiments, a first correction operation and a second correction operation that are different may be performed based on first partial image data and second partial image data of image data.

Figure 8:
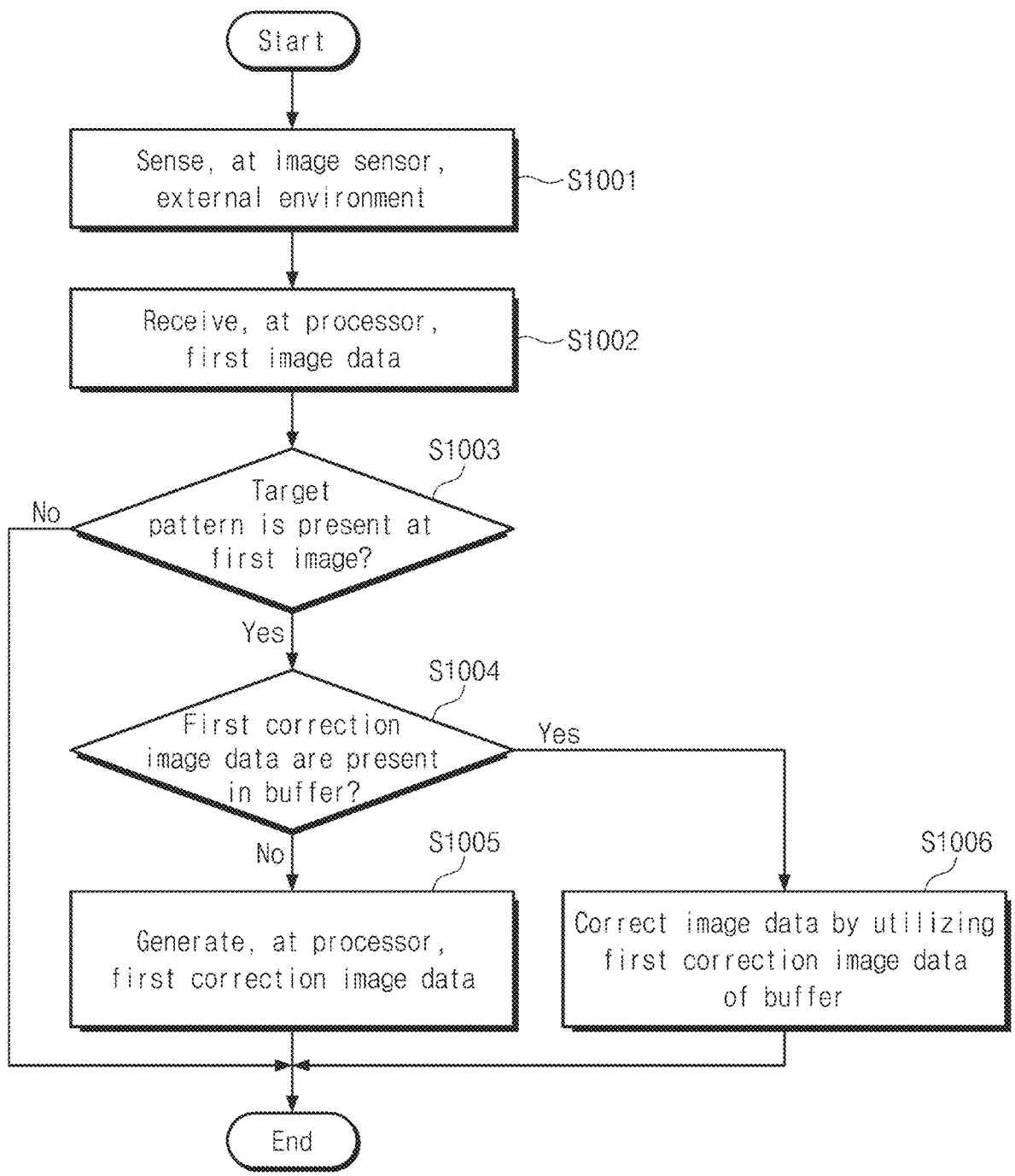
FIG. 8 is a flowchart illustrating a process in which an image processing device corrects image data according to embodiments.

FIG. 8 is a flowchart illustrating a process in which an image processing device corrects image data according to embodiments.

Referring to FIG. 8, the image sensor 110 may sense an external environment and output image data (S1001). For convenience, the output image data will be described as first image data.

When the image data are output from the image sensor 110, the processor 120 may receive the first image data (S1002). The first image data may be data of an RGB format.

When the first image data are received, the processor 120 may determine whether a target pattern is present at a first image data (S1003). Here, the target pattern may be a set of bad pixels present in a row direction, a column direction, or a combination thereof.

When it is determined that the target pattern is present at the first image, the processor 120 may determine whether first correction image data are present in the buffer 130 (S1004). Here, the first correction image data means a correction image of the first image data, which may be previously generated based on the first image previously input (e.g., generated in a previous iteration in which the first image data was received by the processor 120). When it is determined that the target pattern is absent from the first image data, the processor 120 may terminate the image correction process without image correction.

When it is determined that the first correction image data are absent from the buffer 130, the processor 120 may generate the first correction image without utilizing information of the buffer 130 (S1005). According to embodiments, the first correction image data may mean an image where the first image data is corrected. In contrast, when it is determined that the first correction image data are present in the buffer 130, the processor 120 may correct the image data by utilizing the first correction image data of the buffer 130 (S1006).

Figure 9:
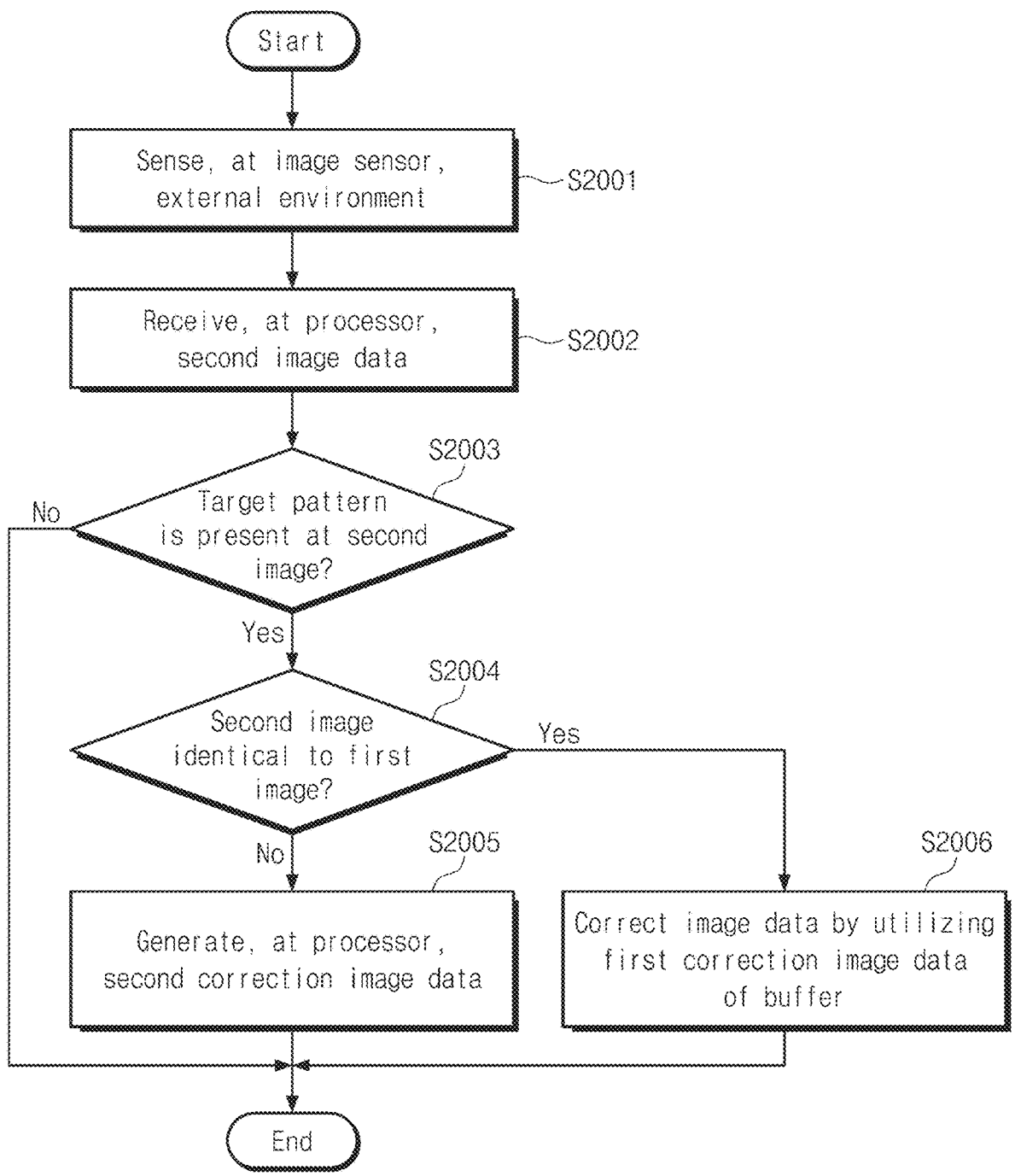
FIG. 9 illustrates a process where an image processing device corrects image data when data associated with a plurality of images are received according to embodiments.

FIG. 9 illustrates a process where the image processing device 100 corrects image data when data associated with a plurality of images are received according to embodiments.

Referring to FIG. 9, the image sensor 110 may sense an external environment and output image data (S2001).

When the image data are output from the image sensor 110, the processor 120 may receive second image data (S2002). Here, the second image data means image data that are received after the first image data. The second image data may be the same as or different from the first image data.

When the second image data are received, the processor 120 may determine whether a target pattern is present at the second image data (S2003). Here, the target pattern may be a set of bad pixels present in a row direction, a column direction, or a combination thereof.

When it is determined that the target pattern is present at the second image data, the processor 120 may determine whether the second image data is the same as or similar to the first image data (S2004). In detail, the processor 120 may extract a pixel pattern of the second image by utilizing the specific frame described above and may determine whether the second image is the same as or similar to the first image data, based on the extracted pixel pattern. Also, through the above method, the processor 120 may determine whether the target patterns of the first image data and the second image data are the same bad pixel pattern or similar bad pixel patterns. According to embodiments, when it is determined that the target pattern is absent from the second image data, the processor 120 may terminate the image correction process without image correction.

When it is determined that the second image data is different from the first image data, the processor 120 may generate second correction image data without utilizing information of the buffer 130 (S2005). Here, the second correction image data means an image where the bad pixel of the second image data is corrected. In contrast, when it is determined that the second image data is the same as or similar to the first image data, the processor 120 may generate the second correction image by utilizing bad pixel information (e.g., first correction image data) of the buffer 130 (S2006).

Meanwhile, embodiments may be implemented as a recording medium storing instructions executable by a computer. The instructions may be stored in the form of a program code, and may generate, when executed by a processor, a program module such that operations of embodiments may be performed. The recording medium may be implemented as a computer-readable recording medium.

Figure 10:
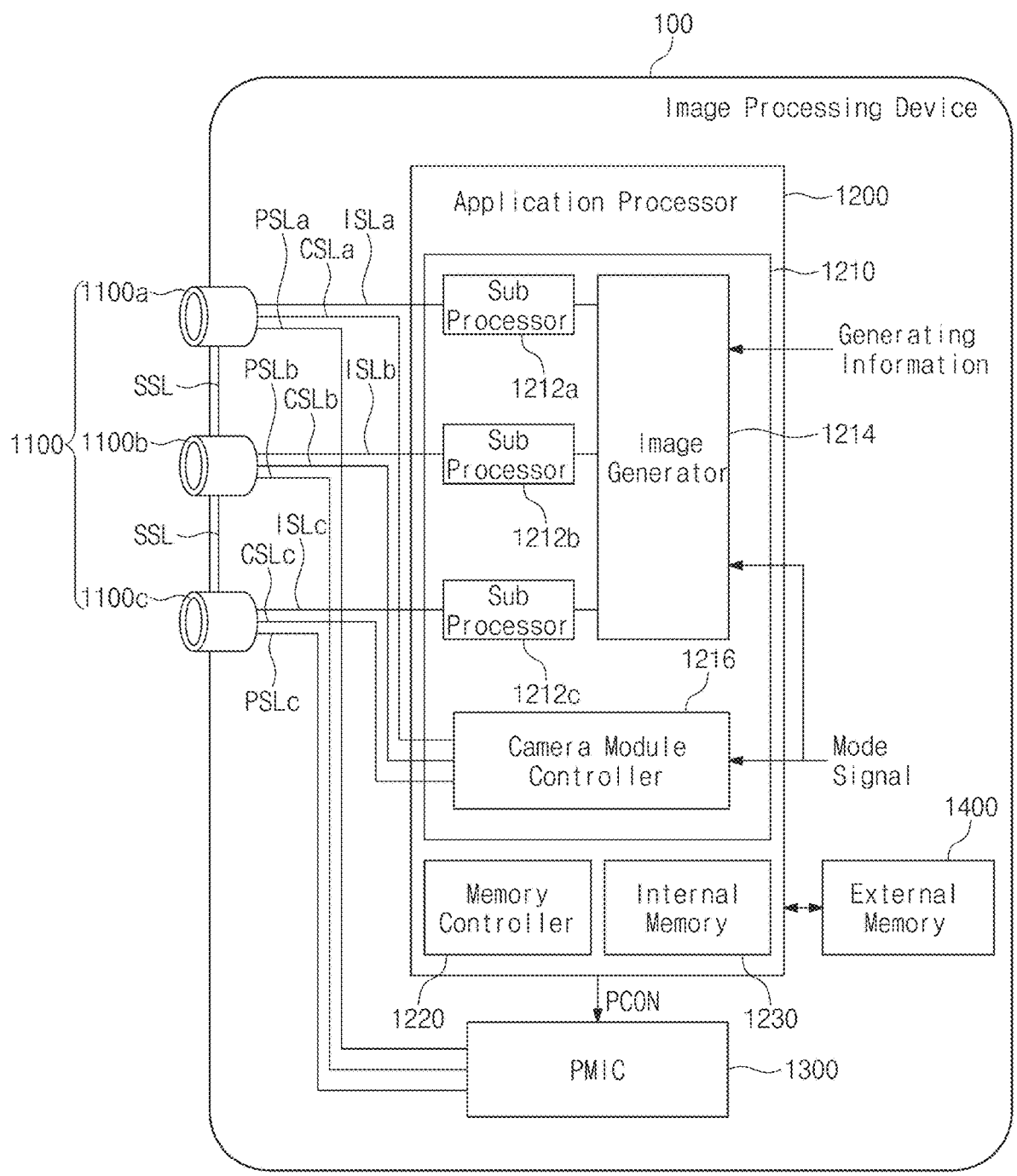
FIG. 10 is an example of an image processing device including a multi-camera module according to embodiments.
Figure 11:
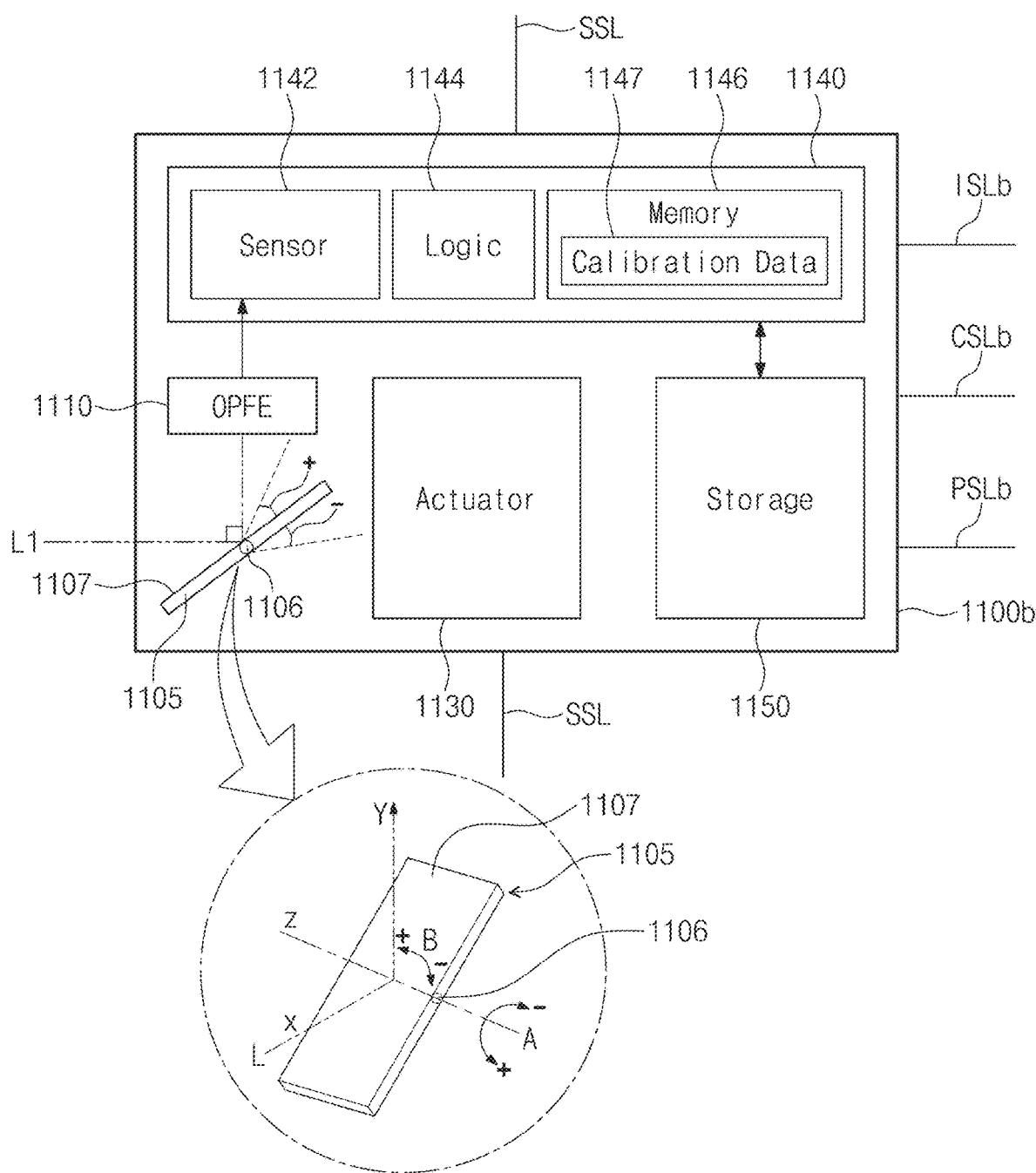
FIG. 11 is a detailed block diagram of a camera module of FIG. 10.

FIG. 10 is an example of the image processing device 100 including a multi-camera module according to embodiments. FIG. 11 is a detailed block diagram of a camera module of FIG. 10.

Referring to FIG. 10, the image processing device 100 may include a camera module group 1100, an application processor 1200, a power management integrated circuit (PMIC) 1300, and/or an external memory 1400.

The camera module group 1100 may include a plurality of camera modules 1100a, 1100b, and 1100c. An example in which three camera modules 1100a, 1100b, and 1100c are disposed is illustrated in FIG. 10, but embodiments are not limited thereto. In embodiments, the camera module group 1100 may be modified to include only two camera modules. Also, in embodiments, the camera module group 1100 may be modified to include "n" camera modules (n being a natural number of 4 or more).

Below, a detailed configuration of the camera module 1100b will be more fully described with reference to FIG. 11, but the following description may be equally or similarly applied to the remaining camera modules 1100a and 1100c.

Referring to FIG. 11, the camera module 1100b may include a prism 1105, an optical path folding element (OPFE) 1110, an actuator 1130, an image sensing device 1140, and/or a storage unit 1150.

The prism 1105 may include a reflecting plane 1107 of a light reflecting material and may change a path of a light "L" incident from the outside.

In embodiments, the prism 1105 may change a path of the light "L" incident in a first direction "X" to a second direction "Y" perpendicular to the first direction "X", Also, the prism 1105 may change the path of the light "L" incident in the first direction "X" to the second direction "Y" perpendicular to the first direction "X" by rotating the reflecting plane 1107 of the light reflecting material in direction "A" or in direction "B" about a central axis 1106. In this case, the OPFE 1110 may move in a third direction "Z" perpendicular to the first direction "X" and the second direction "Y".

In embodiments, as illustrated in FIG. 11, a maximum or upper limit rotation angle of the prism 1105 in direction "A" may be equal to or smaller than 15 degrees in a positive A direction and may be greater than 15 degrees in a negative A direction, but embodiments are not limited thereto.

In embodiments, the prism 1105 may move within approximately 20 degrees in a positive or negative B direction, between 10 degrees and 20 degrees, or between 15 degrees and 20 degrees; here, the prism 1105 may move at the same angle in the positive or negative B direction or may move at a similar angle within approximately 1 degree.

In embodiments, the prism 1105 may move the reflecting plane 1107 of the light reflecting material in the third direction (e.g., a Z direction) parallel to a direction in which the central axis 1106 extends.

The OPFE 1110 may include optical lenses composed of "m" groups (m being a natural number), for example. Here, "m" lens may move in the second direction "Y" to change an optical zoom ratio of the camera module 1100b. For example, when a default optical zoom ratio of the camera module 1100b is "Z", the optical zoom ratio of the camera module 1100b may be changed to an optical zoom ratio of 3Z, 5Z, or 5Z or more by moving "m" optical lens included in the OPFE 1110.

The actuator 1130 may move the OPFE 1110 or an optical lens (hereinafter referred to as an "optical lens") to a specific location. For example, the actuator 1130 may adjust a location of an optical lens such that an image sensor 1142 is placed at a focal length of the optical lens for accurate sensing.

The image sensing device 1140 may include the image sensor 1142, control logic 1144, and/or a memory 1146. The image sensor 1142 may sense an image of a sensing target by using the light "L" provided through an optical lens. The control logic 1144 may control overall operations of the camera module 1100b. For example, the control logic 1144 may control an operation of the camera module 1100b based on a control signal provided through a control signal line CSLb.

The memory 1146 may store information, used for an operation of the camera module 1100b, such as calibration data 1147. The calibration data 1147 may include information used by the camera module 1100b to generate image data by using the light "L" provided from the outside. The calibration data 1147 may include, for example, information about the degree of rotation described above, information about a focal length, information about an optical axis, etc. In the case where the camera module 1100b is implemented in the form of a multi-state camera in which a focal length varies depending on a location of an optical lens, the calibration data 1147 may include a focal length value for each location (or state) of the optical lens and information about auto focusing.

The storage unit 1150 may store image data sensed through the image sensor 1142. The storage unit 1150 may be disposed outside the image sensing device 1140 and may be implemented in a shape where the storage unit 1150 and a sensor chip constituting the image sensing device 1140 are stacked. In embodiments, the storage unit 1150 may be implemented with an electrically erasable programmable read only memory (EEPROM), but embodiments are not limited thereto.

Referring together to FIGS. 10 and 11, in embodiments, each of the plurality of camera modules 1100a, 1100b, and 1100c may include the actuator 1130. As such, the same calibration data 1147 or different calibration data 1147 may be included in the plurality of camera modules 1100a, 1100b, and 1100c depending on operations of the actuators 1130 included therein.

In embodiments, one camera module (e.g., 1100b) among the plurality of camera modules 1100a, 1100b, and 1100c may be a folded lens shape of camera module in which the prism 1105 and the OPFE 1110 described above are included, and the remaining camera modules (e.g., 1100a and 1100c) may be a vertical shape of camera module in which the prism 1105 and the OPFE 1110 described above are not included; however, embodiments are not limited thereto.

In embodiments, one camera module (e.g., 1100c) among the plurality of camera modules 1100a, 1100b, and 1100c may be, for example, a vertical shape of depth camera extracting depth information by using an infrared ray (IR). In this case, the application processor 1200 may merge image data provided from the depth camera and image data provided from any other camera module (e.g., 1100a or 1100b) and may generate a three-dimensional (3D) depth image.

In embodiments, at least two camera modules (e.g., 1100a and 1100b) among the plurality of camera modules 1100a, 1100b, and 1100c may have different fields of view. In this case, the at least two camera modules (e.g., 1100a and 1100b) among the plurality of camera modules 1100a, 1100b, and 1100c may include, but are not limited to, different optical lens.

Also, in embodiments, fields of view of the plurality of camera modules 1100a, 1100b, and 1100c may be different. In this case, the plurality of camera modules 1100a, 1100b, and 1100c may include, but are not limited to, different optical lens.

In embodiments, the plurality of camera modules 1100a, 1100b, and 1100c may be disposed to be physically separated from each other. That is, the plurality of camera modules 1100a, 1100b, and 1100c may not partially use a sensing area of one image sensor 1142, but the plurality of camera modules 1100a, 1100b, and 1100c may include independent image sensors 1142 therein, respectively.

Returning to FIG. 10, the application processor 1200 may include an image processor 1210, a memory controller 1220, and/or an internal memory 1230. The memory controller 1220 may write a data on the internal memory 1230 or read a data from the internal memory 1230. For example, the memory controller 1220 may generate several control signals in response to a request from the image processor 1210. The application processor 1200 may be implemented to be separated from the plurality of camera modules 1100a, 1100b, and 1100c. For example, the application processor 1200 and the plurality of camera modules 1100a, 1100b, and 1100c may be implemented with separate semiconductor chips.

The image processor 1210 may include a plurality of sub image processors 1212a, 1212b, and 1212c, an image generator 1214, and/or a camera module controller 1216.

The image processor 1210 may include the plurality of sub image processors 1212a, 1212b, and 1212c, the number of which corresponds to the number of camera modules 1100a, 1100b, and 1100c.

Image data respectively generated from the camera modules 1100a, 1100b, and 1100c may be respectively provided to the corresponding sub image processors 1212a, 1212b, and 1212c through separated image signal lines ISLa, ISLb, and ISLc. For example, the image data generated from the camera module 1100a may be provided to the sub image processor 1212a through the image signal line ISLa, the image data generated from the camera module 1100b may be provided to the sub image processor 1212b through the image signal line ISLb, and the image data generated from the camera module 1100c may be provided to the sub image processor 1212c through the image signal line ISLc. This image data transmission may be performed, for example, by using a camera serial interface (CSI) based on the MIPI (Mobile Industry Processor Interface), but embodiments are not limited thereto.

Meanwhile, in embodiments, one sub image processor may be disposed to correspond to a plurality of camera modules. For example, the sub image processor 1212a and the sub image processor 1212c may be integrally implemented, not separated from each other as illustrated in FIG.

10; in this case, one of the pieces of image data respectively provided from the camera module 1100a and the camera module 1100c may be selected through a selection element (e.g., a multiplexer), and the selected image data may be provided to the integrated sub image processor.

The image data respectively provided to the sub image processors 1212a, 1212b, and 1212c may be provided to the image generator 1214. The image generator 1214 may generate an output image by using the image data respectively provided from the sub image processors 1212a, 1212b, and 1212c, depending on image generating information or a mode signal.

In detail, the image generator 1214 may generate the output image by merging at least some of the image data respectively generated from the camera modules 1100a, 1100b, and 1100c having different fields of view, depending on the image generating information or the mode signal. Also, the image generator 1214 may select one of the image data respectively generated from the camera modules 1100a, 1100b, and 1100c having different fields of view, depending on the generating information or the mode signal and may generate output image.

In embodiments, the image generating information may include a zoom signal or a zoom factor. Also, in embodiments, the mode signal may be, for example, a signal based on a mode selected from a user.

In the case where the image generating information is the zoom signal (or zoom factor) and the camera modules 1100a, 1100b, and 1100c have different visual fields (or fields of view), the image generator 1214 may perform different operations depending on a kind of the zoom signal. For example, in the case where the zoom signal is a first signal, the image generator 1214 may merge the image data output from the camera module 1100a and the image data output from the camera module 1100c, and may then generate the output image by using the merged image signal and the image data output from the camera module 1100b not used in the merging operation. In the case where the zoom signal is a second signal different from the first signal, without the image data merging operation, the image generator 1214 may select one of the image data respectively output from the camera modules 1100a, 1100b, and 1100c and may generate output image. However, embodiments are not limited thereto, and a way to process image data may be modified without limitation.

In embodiments, the image generator 1214 may generate merged image data having an increased dynamic range by receiving a plurality of image data of different exposure times from at least one of the plurality of sub image processors 1212a, 1212b, and 1212c and performing high dynamic range (HDR) processing on the plurality of image data.

The camera module controller 1216 may provide control signals to the camera modules 1100a, 1100b, and 1100c, respectively. The control signals generated from the camera module controller 1216 may be respectively provided to the corresponding camera modules 1100a, 1100b, and 1100c through control signal lines CSLa, CSLb, and CSLc separated from each other.

Depending on the image generating information or the mode signal, One of the plurality of camera modules 1100a, 1100b, and 1100c may be designated as a master camera (e.g., 1100b), and the remaining camera modules (e.g., 1100a and 1100c) may be designated as a slave camera. The above designation information may be included in the control signals, and the control signals including the designation information may be respectively provided to the corresponding camera modules 1100a, 1100b, and 1100c through the control signal lines CSLa, CSLb, and CSLc separated from each other.

Camera modules operating as a master and a slave may be changed depending on the zoom factor or an operating mode signal. For example, in the case where the field of view of the camera module 1100a is wider than the field of view of the camera module 1100b and the zoom factor indicates a low zoom ratio, the camera module 1100b may operate as a master, and the camera module 1100a may operate as a slave. In contrast, in the case where the zoom factor indicates a high zoom ratio, the camera module 1100a may operate as a master, and the camera module 1100b may operate as a slave.

In embodiments, the control signal provided from the camera module controller 1216 to each of the camera modules 1100a, 1100b, and 1100c may include a sync enable signal. For example, in the case where the camera module 1100b is used as a master camera and the camera modules 1100a and 1100c are used as a slave camera, the camera module controller 1216 may transmit the sync enable signal to the camera module 1100b. The camera module 1100b that is provided with the sync enable signal may generate a sync signal based on the provided sync enable signal and may provide the generated sync signal to the camera modules 1100a and 1100c through a sync signal line SSL. The camera module 1100b and the camera modules 1100a and 1100c may be synchronized with the sync signal to transmit image data to the application processor 1200.

In embodiments, the control signal provided from the camera module controller 1216 to each of the camera modules 1100a, 1100b, and 1100c may include mode information according to the mode signal. Depending on the mode information, the plurality of camera modules 1100a, 1100b, and 1100c may operate in a first operating mode and a second operating mode with regard to a sensing speed.

In the first operating mode, the plurality of camera modules 1100a, 1100b, and 1100c may generate image signals at a first speed (e.g., may generate image signals of a first frame rate), may encode the image signals at a second speed higher than the first speed (e.g., may encode the image signal of a second frame rate higher than the first frame rate), and transmit the encoded image signals to the application processor 1200. In this case, the second speed may be 30 times or less the first speed.

The application processor 1200 may store the received image signals, that is, the encoded image signals in the internal memory 1230 provided therein or in the external memory 1400 placed outside the application processor 1200. Afterwards, the application processor 1200 may read and decode the encoded image signals from the internal memory 1230 or the external memory 1400 and may display image data generated based on the decoded image signals. For example, the corresponding one of the plurality of sub image processors 1212a, 1212b, and 1212c of the image processor 1210 may perform decoding and may also perform image processing on the decoded image signal.

In the second operating mode, the plurality of camera modules 1100a, 1100b, and 1100c may generate image signals at a third speed (e.g., may generate image signals of a third frame rate lower than the first frame rate) and may transmit the image signals to the application processor 1200. The image signals provided to the application processor 1200 may be signals that are not encoded. The application processor 1200 may perform image processing on the received image signals or may store the image signals in the internal memory 1230 or the external memory 1400.

The PMIC 1300 may supply powers, for example, power supply voltages to the plurality of camera modules 1100a, 1100b, and 1100c, respectively. For example, under control of the application processor 1200, the PMIC 1300 may supply a first power to the camera module 1100a through a power signal line PSLa, may supply a second power to the camera module 1100b through a power signal line PSLb, and may supply a third power to the camera module 1100c through a power signal line PSLc.

In response to a power control signal PCON from the application processor 1200, the PMIC 1300 may generate a power corresponding to each of the plurality of camera modules 1100a, 1100b, and 1100c and may also adjust a level of the power. The power control signal PCON may include a power adjustment signal for each operating mode of the plurality of camera modules 1100a, 1100b, and 1100c. For example, the operating mode may include a low-power mode. In this case, the power control signal PCON may include information about a camera module operating in the low-power mode and information about a power level to be set. Levels of the powers respectively provided to the plurality of camera modules 1100a, 1100b, and 1100c may be identical to each other or may be different from each other. Also, a level of a power may be dynamically changed.

According to embodiments, there is provided an image processing device capable of storing, in a buffer, information about a bad pixel and information of an image in which the bad pixel is corrected and utilizing information stored in the buffer when an image is corrected.

Also, according to embodiments, an image may be efficiently corrected by utilizing the information stored in the buffer.

Defective pixels may occur in a specific pattern at the connection of floating nodes. In order to avoid a decreased image sensor yield, conventional devices correct this defect using write-back technology for overwriting a correction result on an input image. However, this write-back technology uses excessive hardware resources (e.g., processor, memory, etc.).

According to embodiments, improved devices and methods are provided for correcting a defective pixel. For example, in embodiments, a correction result may be associated with a given target pattern and stored in a buffer. This correction result may be retrieved from the buffer and used for restoration. Accordingly, the improved devices and methods overcome the deficiencies of the conventional devices to avoid decreased sensor yield without using the excessive hardware resources (e.g., processor, memory, etc.) of the conventional devices.

According to embodiments, operations described herein as being performed by the image processing device 100, the image sensor 110, the processor 120, the image determining device 121, the image correcting device 122, the generator 140, the timing controller 150, the driver 160, the ADC block 180, the data output unit 190, the application processor 1200, the camera module group 1100, the camera module 1100a, the camera module 1100b, the camera module 1100c, the image sensing device 1140, the logic 1144, the image processor 1210, the sub image processor 1212a, the sub image processor 1212b, the sub image processor 1212c, the image generator 1214, the camera module controller 1216, the memory controller 1220 and/or the PMIC 1300 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An image processing device comprising:
a buffer; and
processing circuitry configured to cause the image processing device to,
first detect a first bad pixel pattern based on first image data,
correct the first bad pixel pattern based on a plurality of first values of a plurality of first peripheral pixels in response to the first detection to obtain a first correction result, the plurality of first peripheral pixels being peripheral to the first bad pixel pattern,
second detect the first bad pixel pattern and a second bad pixel pattern based on the first image data, the second bad pixel pattern being adjacent to the first bad pixel pattern,
correct the second bad pixel pattern based on a plurality of second values of a plurality of second peripheral pixels to obtain a second correction result, the plurality of second peripheral pixels being peripheral to the second bad pixel pattern,
correct the first bad pixel pattern by using the first correction result stored in the buffer in response to the second detection,
generate first correction image data associated with a pattern, the pattern comprising the first bad pixel pattern or the second bad pixel pattern, and
store the first correction image data in the buffer.

2. The image processing device of claim 1, wherein the processing circuitry is configured to cause the image processing device to:
receive second image data after receiving the first image data; and
determine whether bad pixels of the first image data are the same as bad pixels of the second image data, the bad pixels of the first image data comprising the first bad pixel pattern and the second bad pixel pattern.

3. The image processing device of claim 2, wherein
the second image data is different from the first image data; and
the processing circuitry is configured to cause the image processing device to correct the second image data based on the first correction image data in response to determining the bad pixels of the first image data are the same as the bad pixels of the second image data, the first correction image data including the first correction result and the second correction result.

4. The image processing device of claim 2, wherein
the second image data is different from the first image data; and
the processing circuitry is configured to cause the image processing device to correct the bad pixels of the second image data to obtain second correction image data in response to determining the bad pixels of the first image data are not the same as the bad pixels of the second image data.

5. The image processing device of claim 1, wherein the pattern comprises both the first bad pixel pattern and the second bad pixel pattern, the first bad pixel pattern and the second bad pixel pattern being associated with a vertical pattern.

6. The image processing device of claim 1, wherein the processing circuitry is configured to cause the image processing device to:
extract a portion of the first image data, the portion including the first bad pixel pattern and the second bad pixel pattern, the first correction image data being associated with the portion.

7. The image processing device of claim 1, wherein the processing circuitry is configured to cause the image processing device to extract a portion of the first image data based on location data of a plurality of pixels, the portion including the first bad pixel pattern and the second bad pixel pattern, and the plurality of pixels including the first bad pixel pattern and the second bad pixel pattern.

8. A control method of an image processing device, the method comprising:
first detecting, by processing circuitry, a first bad pixel pattern based on first image data;
correcting, by the processing circuitry, the first bad pixel pattern based on a plurality of first values of a plurality of first peripheral pixels in response to the first detecting to obtain a first correction result, the plurality of first peripheral pixels being peripheral to the first bad pixel pattern;
second detecting, by the processing circuitry, the first bad pixel pattern and a second bad pixel pattern based on the first image data, the second bad pixel pattern being adjacent to the first bad pixel pattern;
correcting, by the processing circuitry, the second bad pixel pattern based on a plurality of second values of a plurality of second peripheral pixels to obtain a second correction result, the plurality of second peripheral pixels being peripheral to the second bad pixel pattern;
correcting, by the processing circuitry, the first bad pixel pattern by using the first correction result stored in a buffer in response to the second detecting;
generating, by the processing circuitry, first correction image data associated with a pattern, the pattern comprising the first bad pixel pattern or the second bad pixel pattern; and
storing, by the processing circuitry, the first correction image data in the buffer.

9. The method of claim 8, further comprising:
receiving second image data after receiving the first image data; and
determining whether bad pixels of the first image data are the same as bad pixels of the second image data, the bad pixels of the first image comprising the first bad pixel pattern and the second bad pixel pattern.

10. The method of claim 9, wherein
the second image data is different from the first image data; and
the method further comprises correcting the second image data based on the first correction image data in response to determining the bad pixels of the first image data are the same as the bad pixels of the second image data, the first correction image data comprising the first correction result and the second correction result.

11. The method of claim 9, wherein
the second image data is different from the first image data; and
the method further comprises correcting the bad pixels of the second image data to obtain second correction image data in response to determining the bad pixels of the first image data are not the same as the bad pixels of the second image data.

12. The method of claim 8, wherein
the pattern comprises both the first bad pixel pattern and the second bad pixel pattern, the first bad pixel pattern and the second bad pixel pattern being associated with a vertical pattern.

13. The method of claim 8, further comprising:
extracting a portion of the first image data, the portion including the first bad pixel pattern and the second bad pixel pattern, the first correction image data being associated with the portion.

14. The method of claim 8, further comprising:
extracting a portion of the first image data based on location data of a plurality of pixels, the portion including the first bad pixel pattern and the second bad pixel pattern, and the plurality of pixels including the first bad pixel pattern and the second bad pixel pattern.

15. A processor for an image processing device, the processor comprising:
an image determining device configured to,
first detect a first bad pixel pattern based on first image data, and
second detect the first bad pixel pattern and a second bad pixel pattern based on the first image data, the second bad pixel pattern being adjacent to the first bad pixel pattern; and
an image correcting device configured to,
correct the first bad pixel pattern based on a plurality of first values of a plurality of first peripheral pixels in response to the first detection to obtain a first correction result, the plurality of first peripheral pixels being peripheral to the first bad pixel pattern,
correct the second bad pixel pattern based on a plurality of second values of a plurality of second peripheral pixels to obtain a second correction result, the plurality of second peripheral pixels being peripheral to the second bad pixel pattern,
correct the first bad pixel pattern by using the first correction result stored in an external buffer in response to the second detection,
generate first correction image data associated with a pattern, the pattern comprising the first bad pixel pattern or the second bad pixel pattern, and
store the first correction image data in the external buffer.

16. The processor of claim 15, wherein the image determining device is configured to:
receive second image data after receiving the first image data; and
determine whether bad pixels of the first image data are the same as bad pixels of the second image data, the bad pixels of the first image data comprising the first bad pixel pattern and the second bad pixel pattern.

17. The processor of claim 16, wherein
the second image data is different from the first image data; and
the image correcting device is configured to correct the second image data based on the first correction image data in response to determining the bad pixels of the first image data are the same as the bad pixels of the second image data, and the first correction image data including the first correction result and the second correction result.

18. The processor of claim 16, wherein
the second image data is different from the first image data; and
the image correcting device is configured to correct the bad pixels of the second image data to obtain second correction image data in response to determining the bad pixels of the first image data are not the same as the bad pixels of the second image data.

19. The processor of claim 15, wherein
the pattern comprises both the first bad pixel pattern and the second bad pixel pattern, the first bad pixel pattern and the second bad pixel pattern being associated with a vertical pattern.

20. The processor of claim 15, wherein the image correcting device is configured to:
extract a portion of the first image data, the portion including the first bad pixel pattern and the second bad pixel pattern, the first correction image data being associated with the portion.

* * * * *